(12) United States Patent
Bharadwaj et al.

(10) Patent No.: US 8,359,577 B2
(45) Date of Patent: Jan. 22, 2013

(54) SOFTWARE HEALTH MANAGEMENT TESTBED

(75) Inventors: Raj Mohan Bharadwaj, Maple Grove, MN (US); Dinkar Mylaraswamy, Fridley, MN (US); Subhabrata Ganguli, Plymouth, MN (US); Onder Uluyol, Fridley, MN (US)

(73) Assignee: Honeywell International Inc., Morristown, NJ (US)

( * ) Notice: Subject to any disclaimer, the term of this patent is extended or adjusted under 35 U.S.C. 154(b) by 1064 days.

(21) Appl. No.: 12/342,469

(22) Filed: Dec. 23, 2008

(65) Prior Publication Data

US 2010/0161307 A1  Jun. 24, 2010

(51) Int. Cl.
*G06F 9/44* (2006.01)
*G06F 11/00* (2006.01)
*H03M 13/03* (2006.01)

(52) U.S. Cl. .................... 717/124; 714/41; 714/795
(58) Field of Classification Search ............... 717/124
See application file for complete search history.

(56) References Cited

U.S. PATENT DOCUMENTS

| | | | |
|---|---|---|---|
| 5,541,863 A | 7/1996 | Magor et al. | |
| 6,175,948 B1 * | 1/2001 | Miller et al. | 716/105 |
| 6,298,318 B1 | 10/2001 | Lin | |
| 6,950,816 B1 * | 9/2005 | Quernemoen et al. | 1/1 |
| 7,293,213 B1 * | 11/2007 | Xiao et al. | 714/741 |
| 8,103,606 B2 * | 1/2012 | Moussa et al. | 706/31 |
| 2003/0014734 A1 * | 1/2003 | Hartman et al. | 717/125 |
| 2004/0102946 A1 | 5/2004 | Shahabuddin et al. | |
| 2004/0254778 A1 * | 12/2004 | Laurent et al. | 703/25 |
| 2005/0049736 A1 * | 3/2005 | Miyamoto | 700/108 |
| 2005/0223357 A1 * | 10/2005 | Banerjee et al. | 717/120 |
| 2006/0107141 A1 * | 5/2006 | Hekmatpour | 714/724 |
| 2006/0112307 A1 * | 5/2006 | Marisetty et al. | 714/11 |
| 2006/0253840 A1 | 11/2006 | Cruickshank et al. | |
| 2007/0074203 A1 * | 3/2007 | Curtis et al. | 717/174 |
| 2007/0174679 A1 * | 7/2007 | Chelstrom et al. | 714/8 |
| 2007/0174699 A1 * | 7/2007 | Clementi | 714/25 |
| 2008/0009983 A1 | 1/2008 | Mottura | |
| 2008/0319933 A1 * | 12/2008 | Moussa et al. | 706/31 |

OTHER PUBLICATIONS

R.L. Bickford, T.W. Bickmore, V.A. Caluori; Real-Time Sensor Validation for Autonomous Flight Control, 1997, American Institute of Aeronautics and Astronautics, 11 Pages.*

* cited by examiner

*Primary Examiner* — Li B Zhen
*Assistant Examiner* — Arshia S Kia
(74) *Attorney, Agent, or Firm* — Ingrassia Fisher & Lorenz, P.C.

(57) ABSTRACT

A testbed for testing health of software includes an input model, a hardware model, and a resource modeler. The input model represents an input system used in conjunction with the software. The hardware model represents one or more hardware components used in conjunction with the software. The resource modeler is coupled to the input model and the hardware model, and is configured to estimate effects on the software of conditions of the hardware components, the input system, or both.

20 Claims, 4 Drawing Sheets

FIG. 4

SOFTWARE HEALTH MANAGEMENT TESTBED

TECHNICAL FIELD

The present invention generally relates to software health monitoring and, more particularly, to a testbed for software health management.

BACKGROUND

Software products are increasingly important in controlling aircraft, other vehicle, and various other types of devices. The health of software may be monitored and managed using software health management testbeds to help ensure that the software operates effectively under a variety of possible of circumstances that may be encountered by the aircraft, other vehicle, or other device. However, health management of software can be difficult, and traditional software health management testbeds may not also provide optimal results.

Accordingly, it is desirable to provide improved software health management testbeds for monitoring and/or managing the health of software. It is also desirable to improved program products and computer systems that provide such improved software health management testbeds for monitoring and/or managing the health of software. Furthermore, other desirable features and characteristics of the present invention will become apparent from the subsequent detailed description of the invention and the appended claims, taken in conjunction with the accompanying Appendix and this background of the invention.

BRIEF SUMMARY OF THE INVENTION

In accordance with an exemplary embodiment of the present invention, a testbed for testing health of software is provided. The testbed comprises an input model, a hardware model, and a resource modeler. The input model represents an input system used in conjunction with the software. The hardware model represents one or more hardware components used in conjunction with the software. The resource modeler is coupled to the input model and the hardware model, and is configured to estimate effects on the software of conditions of the hardware components, the input system, or both.

In accordance with another exemplary embodiment of the present invention, a program product for testing health of software is provided. The program comprises a program and a computer-readable signal-bearing media. The program comprises a testbed comprising an input model, a hardware model, and a resource modeler. The input model represents an input system used in conjunction with the software. The hardware model represents one or more hardware components used in conjunction with the software. The resource modeler is coupled to the input model and the hardware model, and is configured to estimate effects on the software of conditions of the hardware components, the input system, or both. The computer-readable signal-bearing media bears the program.

In accordance with a further exemplary embodiment of the present invention, a system for testing health of software is provided. The system comprises a processor, a memory, and a program. The system comprises a processor, a memory, and a program. The memory is coupled to the processor. The program resides in the memory, and is configured to be executed by the processor. The program comprises a testbed comprising an input model, a hardware model, and a resource modeler. The input model represents an input system used in conjunction with the software. The hardware model represents one or more hardware components used in conjunction with the software. The resource modeler is coupled to the input model and the hardware model, and is configured to estimate effects on the software of conditions of the hardware components, the input system, or both.

DETAILED DESCRIPTION OF A PREFERRED EMBODIMENT

The following detailed description of the invention is merely exemplary in nature and is not intended to limit the invention or the application and uses of the invention. Furthermore, there is no intention to be bound by any theory presented in the preceding background of the invention or the following detailed description of the invention.

Figure 1:
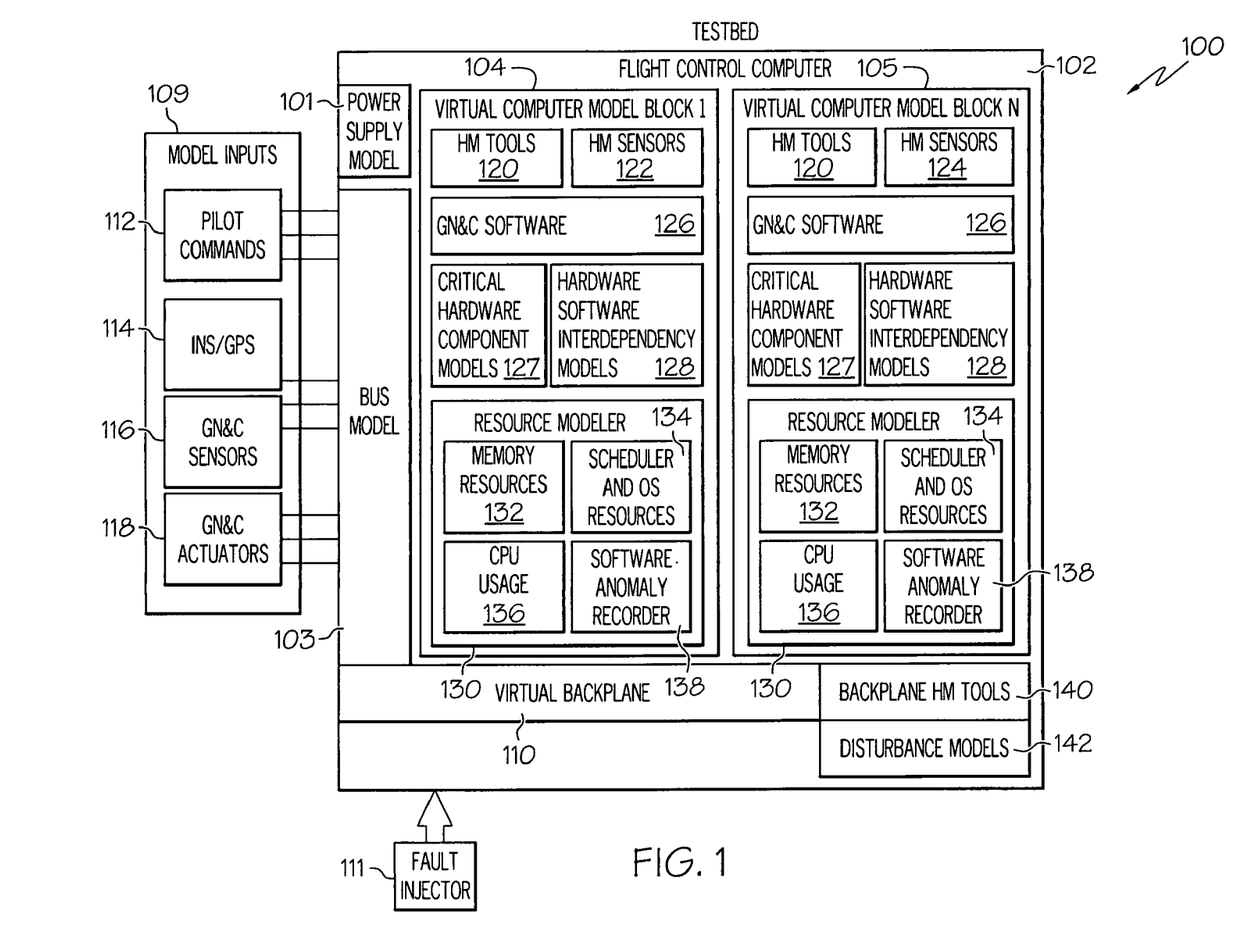
FIG. 1 is a functional block drawing of a testbed for monitoring health of software, in accordance with an exemplary embodiment of the present invention.

FIG. 1 is a functional block drawing of a testbed 100 for monitoring health of software, in accordance with an exemplary embodiment of the present invention. The testbed 100 is configured to monitor hardware and software conditions and faults, and to estimate resulting effects of such hardware and software conditions and faults on the software being tested. The testbed 100 is preferably designed to emulate critical hardware components that have an impact on the software being tested. The testbed 100 preferably includes models that will capture the resources utilization, models for memory, CPU, and disk, and models of middleware monitors to "watch/record" the software system's runtime performance resource usage, among other hardware and software conditions that may affect the software being tested.

As depicted in FIG. 1, in one preferred embodiment the testbed 100 is used to simulate a flight control system of an aircraft, including the computer and the deployed software for a flight control computer 102. In this depicted embodiment, the tesdtbed 100 includes an input model 103, a power supply model 104, one or more virtual computer model blocks 105, a virtual backplane 110, and a fault injector 111. While the testbed 100 is depicted in FIG. 1 as being resident on a flight control computer 102, it will be appreciated that in various other embodiments the testbed 100 can be resident in, coupled to, and/or otherwise used in connection with any number of other different types of computers and/or other systems and/or devices for use in connection with any number of different types of aircraft, automobiles, locomotives, marines, other types of vehicles, and/or any number of other different types of machines, systems and/or devices.

The input model 103 represents an input system used in conjunction with providing input values to the software. For example, in the depicted embodiment, the input model 103 comprises a bus model that receives actual or simulated input values from various modeled inputs 109 such as, by way of example only, pilot commands 112, INS/GPS (global positioning system) inputs 114, GN&C sensor inputs 116, and GN&C actuator inputs 118. The input model 103 may also receive actual or simulated input values from various other hardware sources, from various other types of users of the software, and/or from various other types of software that may be utilized in connection with the software being tested by the testbed 100. The power supply model 104 receives actual or simulated values from one or more power sources that provide power to hardware and/or other devices that are used in connection with the software being tested. In one preferred embodiment, the input model 103 comprises a bus model that includes a network switch model or any one of a number of other different types of connection ports.

Each such virtual computer model block 105 preferable includes health management tools 120, health management sensors 122, GN&C (guidance, navigation, and control) software 126, critical hardware component models 127, and hardware and software interdependency models 128, and a resource modeler 132. The health management tools 120 and health management sensors 122 evaluate and report the health of the critical hardware and software components. Specifically, in a preferred embodiment, the health management tools 120 and health management sensors 122 include various sensors configured to detect conditions of hardware associated with the software along with various monitors configured to detect conditions of the software. It will also be appreciated that the testbed may include any number of virtual computer model blocks 105.

The GN&C software 126 assists with the guidance, navigation, and control of the aircraft and the modeling thereof. In certain embodiments, for example in which the testbed 100 is implemented in other environments and/or in connection with other types of vehicles, machines, and/or devices, GN&C software 126 may not be necessary.

The critical hardware component models 127 represents one or more hardware components used in conjunction with the software being tested. For example, in certain preferred embodiments, the critical hardware component models 127 represent major hardware components, such as busses, memory, and the like, that are important with respect to the functioning of the software being tested. Also in a preferred embodiment, the critical hardware component models 127 each comprises a bus model representing a bus used to provide the input values to the software being tested. In one preferred embodiment, the critical hardware component models 127 represent modeled relationships between hardware components and/or other software on the software being tested.

The hardware and software interdependency models 128 capture the impact of unmodeled hardware components on software on the testbed 100. In one preferred embodiment, the hardware and software interdependency models 128 represent unmodeled relationships which are not represented by the critical hardware component models 127 between hardware components and the software being tested. In addition, in one preferred embodiment, the hardware and software interdependency models 128 include information pertaining to likely effects of conditions or faults of the various hardware on the software (preferably both the software being tested and any other software used in connection therewith), and vice versa.

In certain embodiments, the hardware and software interdependency models 128 obtain such information from the results generating by the testbed 100 through testing, for example via the virtual backplane 110 and/or the resource modeler 130. In other embodiments, the hardware and software interdependency models 128 provide such information to the virtual backplane 110 and/or the resource modeler 130 for use by the virtual backplane 110 and/or the resource modeler 130. In addition, in a preferred embodiment, the hardware and software interdependency models 128 include information relating to a relationship between the software being tested and the hardware used in connection therewith that is utilized to introduce effects due to faults in the unmodeled hardware components and study its effects on the software being tested.

The resource modeler 130 is coupled to the input model 103, the power supply model 104, the health maintenance tools 120, the health maintenance sensors 122, the GN&C software 126, the critical hardware component models 127, the hardware and software interdependency models 128, the virtual backplane 110, and the fault injector 111. The resource modeler 130 is configured to estimate the effects on the software being testing, using conditions of hardware, software, and inputs used in connection with the software being tested as determined by the input model 103, the power supply model 104, the health maintenance tools 120, the health maintenance sensors 122, the GN&C software 126, the critical hardware component models 127, and the hardware and software interdependency models 128.

In a preferred embodiment, the resource modeler 130 mimics the lower level operating system and scheduler functions that normally manage the software on the deployed hardware. In the exemplary testbed 100 of FIG. 1, the resource modeler 130 is used to constrain the available computational (e.g., floating point operations, or FLOPS) and memory resources or modify the schedule process and priority. Also in a preferred embodiment, one or more modules of the software being tested connect to the resource modeler 130 as well as to the input model 103 and the critical hardware component models 127.

In addition, in one preferred embodiment, the resource modeler 130 includes a memory resources unit 132, a scheduler and operating system (OS) resources unit 134, a central processing unit (CPU) resources unit 136, and a software anomaly recorder 138. The memory resources unit 132 obtains information as to usage of memory in the system by various hardware and other software (preferably from the power supply model 104, the health maintenance tools 120, the health maintenance sensors 122, and/or the GN&C software 126) and estimates one or more effects of such usage of the memory on the software being tested. The scheduler and OS resources unit 134 obtains information as to system scheduling and usage of operating system resources in the system by various hardware and other software (preferably from the power supply model 104, the health maintenance tools 120, the health maintenance sensors 122, and/or the GN&C software 126) and estimates one or more effects of such system scheduling and usage of operating system resources on the software being tested. The CPU usage unit 136 obtains information as to usage of the central processing unit of the system by various hardware and other software (preferably from the power supply model 104, the health maintenance tools 120, the health maintenance sensors 122, and/or the GN&C software 126) and estimates one or more effects of such central processing usage.

The memory resources unit 120, the scheduler and OS resources unit 134, and the CPU usage unit 136 preferably utilize the information from the critical hardware component models 127 and the hardware and software interdependency models 128 in providing these estimates. In addition, in certain preferred embodiments, the scheduler and operating system (OS) resources unit 134, and the CPU usage unit 136 provide the results of these estimates to the critical hardware component models 127 and the hardware and software interdependency models 128 for storage and implementation therein and for use in subsequent utilization of the testbed 100 for testing software. Also in a preferred embodiment, the software anomaly recorder 138 records the estimation of such effects of the hardware, the inputs, the other software, and/or combinations thereof on the software being tested and any resulting software conditions, faults, or anomalies. However, it will be appreciated that in certain testbeds such a software anomaly recorder 138 may not be required.

The fault injector 111 is utilized to inject, for testing purposes, one or more faults in the input values, hardware, and/or other software used in connection with the software being tested. In a preferred embodiment, all runtime fault injection in the system is performed by the experimental fault injector 111 module of the testbed 100. Such injected faults are preferably monitored by the power supply model 104, the health maintenance tools 120, the health maintenance sensors 122, and/or the GN&C software 126, and information pertaining thereto is preferably provided by the power supply model 104, the health maintenance tools 120, the health maintenance sensors 122, and/or the GN&C software 126 to the resource modeler 130 for processing.

The resource modeler 130 then utilizes this information, along with the information provided by the critical hardware component models 127 and the hardware and software interdependency models 128, to estimate the resulting effects, on the software being tested, of the faults injected by the fault injector 111. In certain preferred embodiments, the resource modeler 130, in so doing, simultaneously estimates effects of such injected faults on the software being tested along with the hardware and other software used in connection therewith, all in a single software platform comprising the testbed 100 of FIG. 1.

In addition, in a preferred embodiment, the resource modeler 130 comprises a means of identifying any problems or symptoms that may be a result of resources utilized by the software being tested. For example, in one preferred embodiment, the resource modeler 130 models the resources available to the software being tested. Also in a preferred embodiment, the resource modeler 130 constrains and limits the resources used by the software under test, to thereby enable a user to detect any problems or symptoms in the software that may be caused by or due to the resources utilized by the software when the software is running under non-nominal resources. For example, if a problem or symptom is detected while the software is using a particular set of resources but the problem or symptom is not detected when the software is running under a constraint that disallows such use of the particular set of resources, then such problem or symptom may be able to be associated with the particular set of resources and then investigated further in connection therewith.

Also in one preferred embodiment, the virtual backplane 110 includes backplane health maintenance tools 140 and disturbance models 142 that are utilized by the resource modeler in analyzing the effect of the software being tested as implemented on a plurality of computers or devices by aggregating the effects on the software from each of the plurality of computers, devices, or systems. For example, in one preferred embodiment, the disturbance models 142 are used to inject stochastic disturbances in the system. Specifically, in one preferred embodiment, the disturbance models 142 are used to inject unmodeled effects on the software, for example unmodeled effects of the input values and/or the hardware components on the software being tested. In addition, also in a preferred embodiment, the hardware redundancy of the system is simulated by simulating the virtual backplane 100 and multiple virtual computer blocks 105 as shown in FIG. 1. However, in certain other embodiments, for example in which the software being tested is implemented on a single computer, device, or system, the backplane health maintenance tools 140 and/or the disturbance models 142 may not be necessary. Also in a preferred embodiment, the virtual backplane 110 is used to share data in the lockstep safety critical processes where the same calculation is performed using parallel resources (or computers) and the results are compared after each step.

In a preferred embodiment involving a GN&C simulation testbed, software components of the system are mapped to the runtime flight computer hardware, thus capturing the hardware-software interactions. Hardware components (e.g., I/O buses, power supply) are preferably modeled in Matlab/Simulink while software components will be modeled using the compiled version of the software blocks that now interact with each other through the hardware models. This allows the dynamic injection of hardware failures into the system. Further, this allows for the injection of both deterministic and/or stochastic disturbances from other unmodeled subsystems. The software failures are preferably generated by modeling violations such as the illegal jump, improper initialization, and memory overflows. Using this approach, one can study the propagation of failures through the system and evaluate their impact. The effects of both user and system inputs can also be studied using the closed-loop GN&C simulation testbed. In a preferred embodiment.

Accordingly, in accordance with a preferred embodiment of the present invention, the testbed 100 of FIG. 1 uses a model-based approach for software health management. Also in a preferred embodiment, the testbed 100 utilizes three basic building blocks, namely, various monitors, subsystem health models, and temporal graphs. In this approach, the monitors perform the intelligent sensing of the software modules, middleware, and deployment hardware at runtime. They sense the inputs, hardware, software, and computational resources and perform continuous anomaly detection using statistical analysis and pattern matching techniques in a preferred embodiment. The monitors preferably feed their response to the subsystem model, which probabilistically evaluates the health of the software subsystem. In addition, in a preferred embodiment, the subsystem health model provides the health indication using a Pass/Fail outcome along with a corresponding confidence value.

At the software system level, these outcomes are rolled up using temporal causal graphs with knowledge fusion to provide the overall system-level health inference. The causal graphs are powerful tools for capturing the software transition paths. The hardware dependencies are captured both at the subsystem level and at the causal graph level. In this approach, the anomaly or fault in the software system is detected by Fail on any subsystem outcome or temporal causal graph transition violations. The use of causal graph allows the application of mathematical tools for modeling and reasoning.

In one preferred embodiment, the vehicle testbed 100 can be used in connection with software used in or for an aircraft or a fleet of aircraft. In another embodiment, the vehicle testbed 100 can be used in connection with software used in or for an automobile or a fleet of automobiles. In yet another embodiment, the vehicle testbed 100 can be used in software used in or for connection with a locomotive or a fleet of locomotives. In other embodiments, the vehicle testbed 100 can be used in connection with software used in or for various other different types of vehicles and/or other machines and/or devices.

Figure 2:
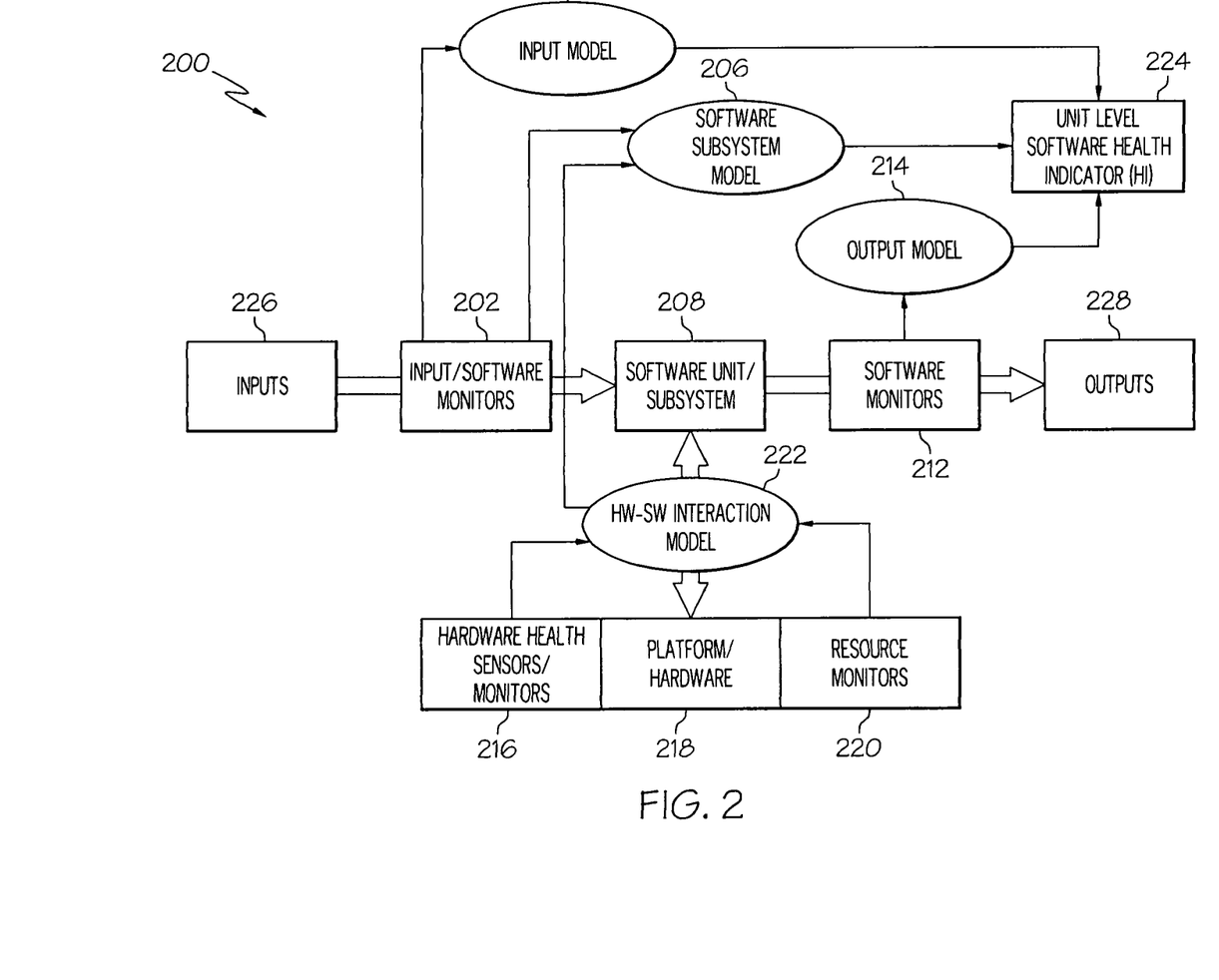
FIG. 2 is a functional block diagram of an implementation of a functional flow of the testbed of FIG. 1, in accordance with an exemplary embodiment of the present invention.

Turning now to FIG. 2, a functional block diagram of an implementation of a functional flow 200 of the testbed 100 of FIG. 1, in accordance with an exemplary embodiment of the present invention.

The condition indicators that are recorded at the monitoring layers will be further processed to generate health indicators (HIs) and prognostic indicators (PIs). HI refers to the currently actionable state of the system. It could be as simple as green/yellow/red or more enumerated based on the health condition ranges set. In addition to the current state, a probabilistic prediction for future health can be made using trending. Trending algorithms extrapolate the available data into the future. In doing this, trending takes into account the randomness present in the data and reports its result with an associated confidence index. In the context of health monitoring, the prediction is mapped to a prognostic indicator. PI includes health conditions at various look-ahead times and their associated probabilities of occurrence as well as the failure mode responsible for the degradation in health.

At the system level, the health indicator from the software subsystem is preferably rolled up using a temporal causal graph (TCG) and knowledge fusion to provide system-level inference. A TCG captures causal and temporal relations among the system variables that characterize dynamic system behavior. These preferably include an extended form of signal flow graphs with vertices representing the system variables (e.g., execution time, values, memory usage, and hardware state) and labeled directed edges capturing the relations between the vertices. Labels on the edges further qualify the relations between the vertices. Backward and forward propagation algorithms are defined on the TCG structure to generate qualitative fault signatures for hypothesized fault parameters. These fault signatures capture the magnitude and higher order changes in a measurement after a fault occurs in the system. Comparing observed deviations in measurements to hypothesized fault signatures is the basis for the fault isolation algorithm.

As shown in FIG. 2, various inputs 226 are provided to input/software monitors 202 of the system. In one preferred embodiment, the inputs 226 correspond to the pilot commands 112, the INS/GPS inputs 114, the GN&C sensors 116, and the GN&C actuators 118 of FIG. 1. Also in on such preferred embodiment, the input/software monitors 202 correspond to the health maintenance tools 120 and health maintenance sensors 122 of FIG. 1.

The information regarding the inputs 226 is then provided both to an input model 204 and a software subsystem model 206. The input model 204 preferably corresponds to the input model 103 of FIG. 1, and determines information regarding the various inputs 226. The input model 204 preferably models the interaction of the inputs 226 with the hardware and software and determines whether any faults are present with the inputs 226. For example, the input model 204 preferably uses values of the inputs 226 to identify any conditions, faults, and/or irregularities that can be determined in such values of the inputs 226, and whether the values of the inputs 226 fall within generally accepted feasible ranges for the inputs 226 (for example, whether such values fall within any upper and lower bounds of feasible values as determined using a physics-based model, input/output values, and/or using other known or previously-recorded values). Such values and information are then provided to the unit level software health indicator 224, discussed further below, for further processing. In addition, if it is determined that there are no such faults with the inputs 226, then the input/software monitors 202 provide such information pertaining to the inputs 226 to a software unit subsystem 208.

The software unit subsystem 208 monitors the inputs 226, and preferably captures any hardware problems associated with the system. In addition, the software unit/subsystem 208 preferable receives information form one or more hardware and software interaction models 222 (preferably corresponding to the hardware and software interdependency models 128 of FIG. 1) with information obtained from hardware sensors 216, platforms hardware 218, and resource monitors 220.

The software unit subsystem 208 preferably uses the collective information from the inputs 226, the input/software monitors 202, the hardware and software interaction models 222, the hardware sensors 216, the platforms hardware 218, and the resource monitors 220 to capture any conditions, problems, or faults with the hardware used in connection with the software being tested. Preferably, in so doing, the software unit subsystem 208 captures any conditions, problems, or faults with the hardware, the buses used in connection therewith and with the software, the timing of the system, and the allocation and usage of the resources of the system.

In addition, the collective information from the software unit subsystem 208 (preferably including the fault determinations made by the software unit subsystem 208 as well as the underlying information obtained by the software unit subsystem 208 from the inputs 226, the input/software monitors 202, the hardware and software interaction models 222, the hardware sensors 216, the platforms hardware 218, and the resource monitors 220) to determine any resulting effects, conditions, problems, or faults on any software used in connection with the hardware or used in connection with the software being tested.

The combined information as to the conditions, faults, or problems with the hardware and software used in connection with the software being tested are then tested using an output model 214 to determine the feasibility of such values (for example, whether such values fall within any upper and lower bounds of feasible values as determined using a physics-based model, input/output values, and/or using other known, previously-recorded values, and/or other generally accepted values). The ultimate results of the conditions, faults, or problems values, assuming that they pass such a feasibility test, are then provided as a unit level software health indicator 224 for further processing and aggregation as to the overall health of the software being tested. In addition, in a preferred embodiment, the subsystem unit level values and/or the aggregate values as to the health of the software being tested may also be provided as output 228 to one or more users of the testbed 100.

In a preferred embodiment, the hardware and software interaction models 222 include preliminary input, output, and hardware-software interaction models that are in the form of multivariate time-independent models. The data are preferably represented in terms of distributions based on goodness-of-fit tests. In a preferred embodiment, the advanced models incorporate time dependency and use stochastic process modeling techniques such as Markov chains. Besides monitoring for anomalies in the external environment, this approach is also useful in validating fault models. The fault condition data that is outside of the nominal range is generated by adjusting distribution parameters. Input statistics, such as the information pertaining to the inputs 226 described above, are also preferably used to set and distinguish faults at different severity levels for the testbed.

Also in a preferred embodiment, a different unit level software health indicator 224 is generated for each module of the software being tested. The various such unit level software health indicators 224 are preferably are preferably further processed to generate overall software health indicators and prognostic indicators, as will be described below and further depicted in FIG. 3 in accordance with one preferred embodiment of the present invention. In a preferred embodiment, each unit level software health indicator 224 refers to the currently actionable state of the system. By way of example only, this could be as simple as green/yellow/red or more enumerated based on the health condition ranges set.

In addition to the current state, a probabilistic prediction for future health can be made using trending. Trending algorithms extrapolate the available data into the future. In so doing, trending preferably takes into account the randomness present in the data and reports its result with an associated confidence index. In the context of health monitoring, the prediction is preferably mapped to a prognostic indicator. In one preferred embodiment, such a prognostic indicator represents health conditions at various look-ahead times and their associated probabilities of occurrence as well as the failure mode responsible for the degradation in health in the software being tested.

At the system level, each unit level software health indicator 224 is preferably rolled up using a temporal causal graph (TCG) and knowledge fusion to provide system-level inference. One exemplary TCG is depicted as graph 304 of FIG. 3 in connection with one exemplary embodiment of the present invention. However, this may vary in other embodiments.

A TCG captures causal and temporal relations among the system variables that characterize dynamic system behavior. In a preferred embodiment, these include an extended form of signal flow graphs, with vertices representing the system variables (e.g., execution time, values, memory usage, and hardware state) and labeled directed edges capturing the relations between the vertices. Also in a preferred embodiment, labels on the edges further qualify the relations between the vertices. Backward and forward propagation algorithms are defined on the TCG structure to generate qualitative fault signatures for hypothesized fault parameters. These fault signatures capture the magnitude and higher order changes in a measurement after a fault occurs in the system. Also in a preferred embodiment, comparing observed deviations in measurements to hypothesized fault signatures comprises the basis for the fault isolation algorithm.

Figure 3:
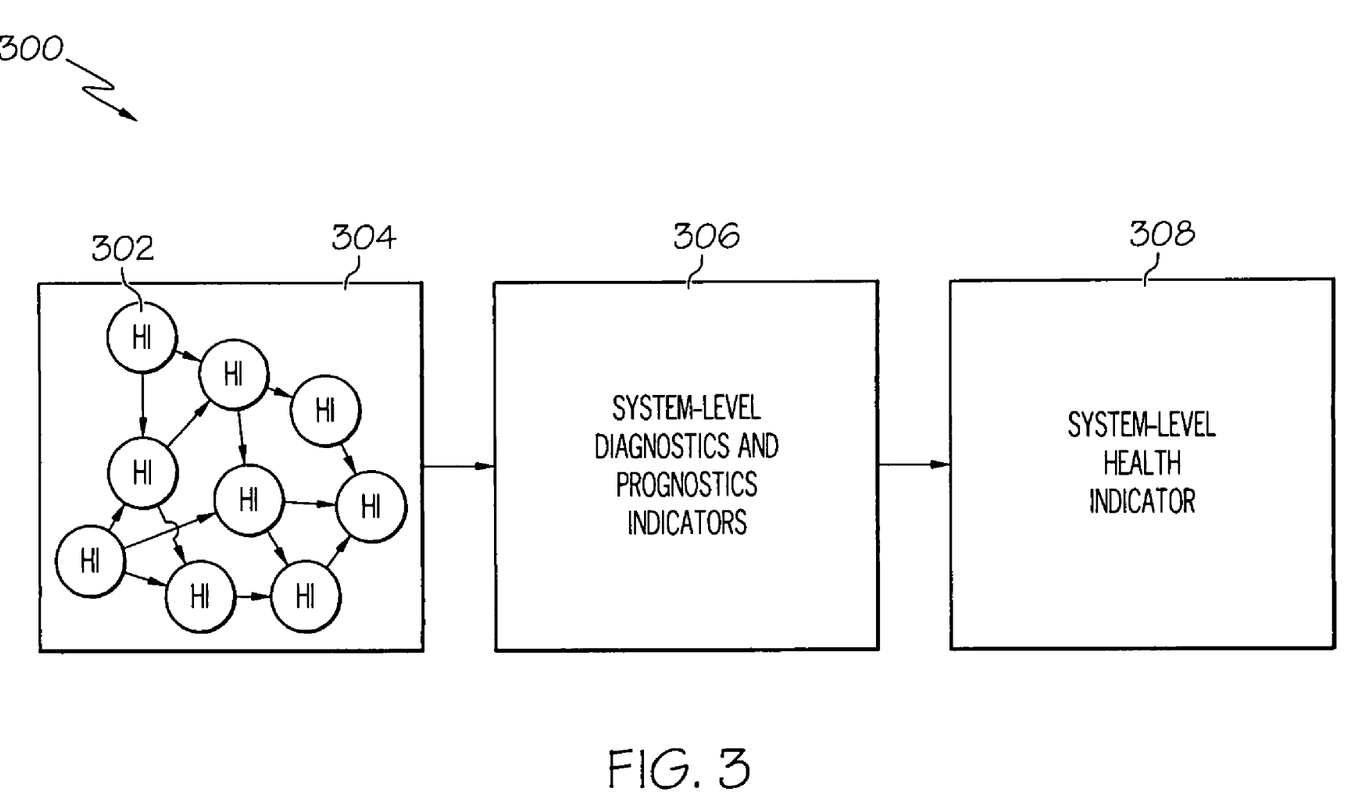
FIG. 3 is a functional block diagram of an exemplary extension of the functional flow of FIG. 2, in accordance with an exemplary embodiment of the present invention.

Turning now to FIG. 3, a functional block diagram of an exemplary extension 300 of the functional flow 200 of FIG. 2, in accordance with an exemplary embodiment of the present invention. As shown in FIG. 3, the extension 300 of FIG. 3 includes the aggregation of various individual health indicators 302 into a health indicator aggregation 304 of the software being tested. In a preferred embodiment, each individual health indicator 302 represents the unit level software health indicator 224 of FIG. 1 of a particular unit of the software being tested, in which the software being tested comprises a plurality of units. Also in a preferred embodiment, the health indicator aggregation 304 incorporates interdependencies of the various software units, and, therefore, the interactive effects of the various individual health indicators 302 during the aggregation.

In addition, in a preferred embodiment, each of the individual health indicators 302 represent a subsystem health indication for a particular subsystem or unit of the software along with a corresponding confidence value. At the software system level, these outcomes are rolled up or aggregated, preferably using temporal causal graphs with knowledge fusion to provide overall system-level health inferences. The hardware dependencies are preferably captured both at the subsystem level and at the causal graph level. Accordingly, preferably any anomaly or fault in the software system is detected with a Fail notation on any subsystem outcome or temporal causal graph transition violations.

The health indicator aggregation 304 is then preferably used to determine system-level diagnostics and prognostics indicators 306, and ultimately to generate a system-level health indicator 308 based therein for the software being tested and the hardware and other software used in connection therewith. As previously discussed above, the health indicator aggregation 304 may take the form of a temporal causal graph (TCG) in certain embodiments, such as that depicted in FIG. 3. However, this may vary in other embodiments. For example, in another preferred embodiment, Bayesian probabilistic techniques are used in generating the system-level diagnostics and prognostics indicators 306 and the system level health indicator 308. In certain other preferred embodiments, any one or more of a number of other mathematical techniques may be used.

Also in a preferred embodiment, in addition to aggregating the evidence for the system modeling, the testbed also serves as a mechanism for interrogating one subsystem against another. For example, improper transitions between subsystems that are modeled using the graph connections and improper correlations between the individual health indicators 302 would indicate failures. A core fault isolation scheme preferably is directed to analysis of abrupt parameter value changes and the corresponding analysis of transient behavior. A fault detection and isolation (FDI) scheme preferably explicitly separates the fault detection task from the fault isolation and identification tasks. Fault identification uses search methods to perform quantitative parameter estimation with multiple candidate hypotheses using least square error techniques. The fault isolation is preferably accomplished by applying standard graphical reasoning techniques such as Bayesian and diagnostics inference reasoning and/or by utilizing Dempster-Shafer for Knowledge Fusion extensively to propagate diagnostics and prognostic probabilities, among other possible mathematical techniques.

Figure 4:
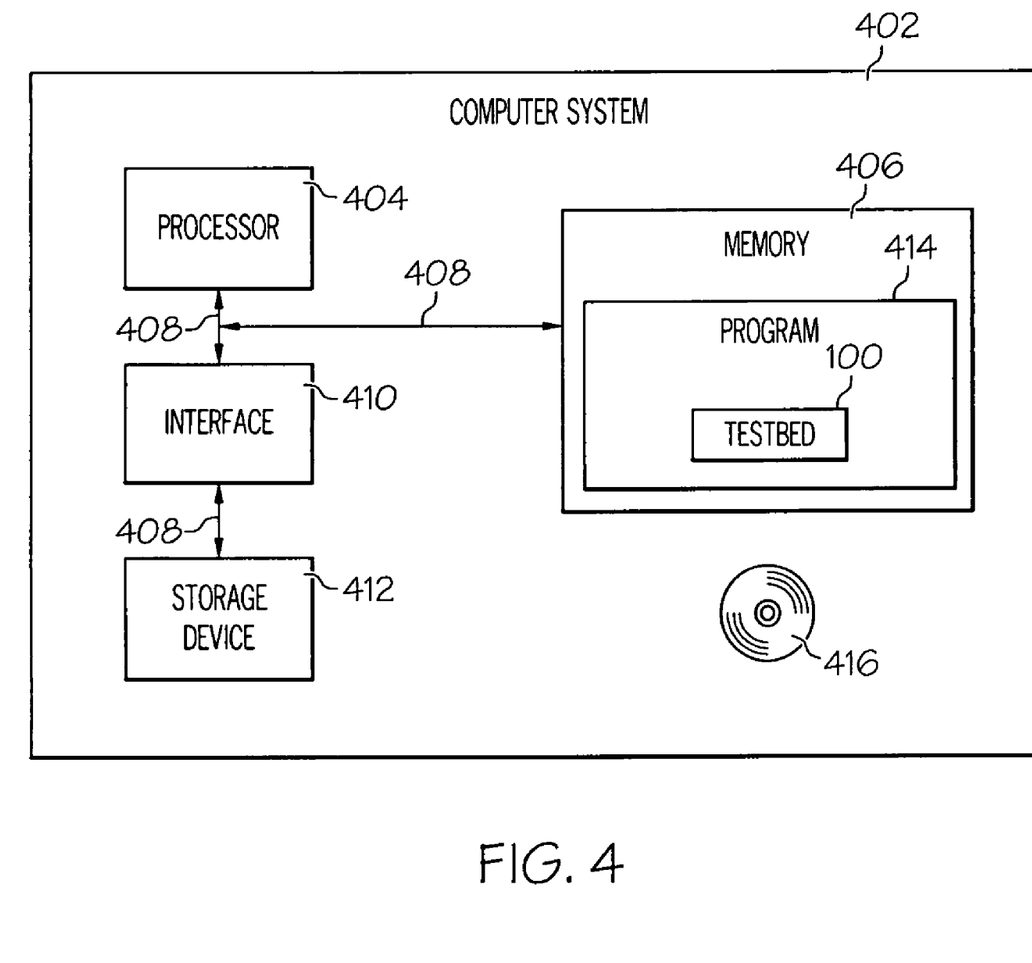
FIG. 4 is a functional block diagram of an exemplary computer system that can be used to implement the testbed of FIG. 1, the functional flow of FIG. 2, and the extension of FIG. 3, in accordance with an exemplary embodiment of the present invention.

Turning now to FIG. 4, a functional block diagram is provided of an exemplary computer system 402 that can be used to implement the testbed 100 of FIG. 1, the functional flow of FIG. 2, and the extension of FIG. 3, in accordance with an exemplary embodiment of the present invention. As depicted in FIG. 4, the computer system 402 includes a processor 404, a memory 406, a computer bus 408, a computer interface 410, and a storage device 412. The processor 404 performs the computation and control functions of the computer system 402, and may comprise any type of processor 404 or multiple processors 404, single integrated circuits such as a microprocessor, or any suitable number of integrated circuit devices and/or circuit boards working in cooperation to accomplish the functions of a processing unit.

During operation, the processor 404 executes one or more software health monitoring programs 414 preferably stored within the memory 406 and, as such, controls the general operation of the computer system 402. Such one or more software health monitoring programs 414 are preferably coupled with a computer-readable signal bearing media bearing the product. Such program products may reside in and/or be utilized in connection with any one or more different types of computer systems 402, which can be located in a central location or dispersed and coupled via an Internet or various other different types of networks or other communications.

The memory 406 stores one or more software health monitoring programs 414 that at least facilitates conducting health monitoring one or more systems of a vehicle and/or facilitating operation of the program 414 and the testbed 100 and/or various components thereof, such as those described above. As depicted in FIG. 4, the software health monitoring program 414 includes the testbed 100 of FIG. 1.

The memory 406 can be any type of suitable memory. This would include the various types of dynamic random access memory (DRAM) such as SDRAM, the various types of static RAM (SRAM), and the various types of non-volatile memory (PROM, EPROM, and flash). It should be understood that the memory 406 may be a single type of memory component, or it may be composed of many different types of memory components. In addition, the memory 406 and the processor 404 may be distributed across several different computers that collectively comprise the computer system 402. For example, a portion of the memory 406 may reside on a computer within a particular apparatus or process, and another portion may reside on a remote computer.

The computer bus 408 serves to transmit programs, data, status and other information or signals between the various components of the computer system 402. The computer bus 408 can be any suitable physical or logical means of connecting computer systems 402 and components. This includes, but is not limited to, direct hard-wired connections, fiber optics, and infrared and wireless bus technologies.

The computer interface 410 allows communication to the computer system 402, for example from a system operator and/or another computer system, and can be implemented using any suitable method and apparatus. It can include one or more network interfaces to communicate to other systems or components, one or more terminal interfaces to communicate with technicians, and one or more storage interfaces to connect to storage apparatuses such as the storage device 412.

The storage device 412 can be any suitable type of storage apparatus, including direct access storage devices 412 such as hard disk drives, flash systems, floppy disk drives and optical disk drives. In one exemplary embodiment, the storage device 412 is a program product from which memory 406 can receive a software health monitoring program 414 that at least facilitates performing health monitoring on software, for example software used in or for an aircraft or other vehicles. The storage device 412 can comprise a disk drive device that uses disks 416 to store data. As one exemplary implementation, the computer system 402 may also utilize an Internet website, for example for providing or maintaining data or performing operations thereon.

It will be appreciated that while this exemplary embodiment is described in the context of a fully functioning computer system 402, those skilled in the art will recognize that the mechanisms of the present invention are capable of being distributed as a program product in a variety of forms, and that the present invention applies equally regardless of the particular type of computer-readable signal bearing media used to carry out the distribution. Examples of signal bearing media include: recordable media such as floppy disks, hard drives, memory cards and optical disks, and transmission media such as digital and analog communication links.

Accordingly, improved software health management testbeds, program products, and computer systems are provide for monitoring and/or managing the health of software. The improved software health management testbeds, program products, and computer systems allow for improved software health management, for example by providing for monitoring and/or management of not only the software being tested, but also of the hardware, other software, and input values used in connection with the software being tested, and including the effects of the hardware, other software, and input values on the software being tested and incorporating the interactions between the hardware, the other software, the input values, and the software being tested, all in a software testbed environment in accordance with a preferred embodiment of the present invention. As discussed above, the improved software health management testbeds, program products, and computer systems can be used in connection with any number of different types of vehicles, vehicle systems, vehicle fleets, and/or other systems and/or combinations thereof.

While at least one exemplary embodiment has been presented in the foregoing detailed description of the invention, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment of the invention, it being understood that various changes may be made in the function and arrangement of elements described in an exemplary embodiment without departing from the scope of the invention as set forth in the appended claims and their legal equivalents.

We claim:

1. A testbed for testing health of avionics software, the testbed comprising a memory and a program stored in the memory and configured to be executed by a processor, the program comprising;

an input model representing an input system for the avionics software, the input model providing inputs from external systems;

a hardware model representing one or more avionics hardware components on which the avionics software runs;

a resource modeler coupled to the input model and the hardware model, the resource modeler configured to estimate effects on the avionics software of conditions of the avionics hardware components, other software modules other than the avionics software, or both;

one or more interdependency models coupled to the input model and the resource modeler, the interdependency models including information relating to one or more relationships between the avionics software and the hardware that are not modeled in the hardware model and that are utilized by the resource modeler to introduce effects due to faults in the one or more avionics hardware components and to study effects of the faults on the avionics software;

a fault injector configured to simulate one or more faults in one or more of the hardware, the other software modules, or the inputs;

a disturbance model coupled to the fault injector and the resource modeler, the disturbance model including information relating to a relationship between the one or more faults and the avionics software that is utilized by the resource modeler in estimating the effects on the avionics software of the one or more faults;

a plurality of sensor models configured to detect conditions of the hardware; and a plurality of monitors configured to detect conditions of the avionics software;

wherein the resource modeler is coupled to the plurality of sensors and the plurality of monitors and is configured to estimate the effects on the avionics software using the conditions of the hardware and the conditions of the avionics software.

2. The testbed of claim 1, wherein the hardware model comprises a bus module representing a bus used to provide values from the input system to the avionics software.

3. The testbed of claim 1, wherein the resources modeler comprises a resources unit configured to at least facilitate estimating the effects on the avionics software of an allocation of one or more resources of a computer device.

4. The testbed of claim 3, wherein the resources modeler further comprises a recorder.

5. A program product for testing health of avionics software, the program product comprising:
- a program configured to test the health of the avionics software, the program comprising a testbed comprising:
  - an input model representing an input system for the avionics software, the input model providing inputs from external systems;
  - a hardware model representing one or more avionics hardware components on which the avionics software runs;
  - a resource modeler coupled to the input model and the hardware model, the resource modeler configured to estimate effects on the avionics software of conditions of the avionics hardware components, other software modules other than the avionics software, or both;
  - one or more interdependency models coupled to the input model and the resource modeler, the interdependency models including information relating to one or more relationships between the avionics software and the hardware that are not modeled in the hardware model and that are utilized by the resource modeler to introduce effects due to faults in the one or more avionics hardware components and to study effects of the faults on the avionics software;
  - a fault injector configured to simulate one or more faults in one or more of the hardware, the other software modules, or the inputs;
  - a disturbance model coupled to the fault injector and the resource modeler, the disturbance model including information relating to a relationship between the one or more faults and the avionics software that is utilized by the resource modeler in estimating the effects on the avionics software of the one or more faults;
  - a plurality of sensor models configured to detect conditions of the hardware; and
  - a plurality of monitors configured to detect conditions of the avionics software;
  - wherein the resource modeler is coupled to the plurality of sensors and the plurality of monitors and is configured to estimate the effects on the avionics software using the conditions of the hardware and the conditions of the avionics software; and
- a non-transitory, computer readable storage medium storing the program.

6. The program product of claim 5, wherein the hardware model comprises a bus module representing a bus used to provide values from the input system to the avionics software.

7. The program product of claim 5, wherein the resources modeler comprises a resources unit configured to at least facilitate estimating the effects on the avionics software of an allocation of one or more resources of a computer device.

8. The program product of claim 7, wherein the resources modeler further comprises a recorder.

9. A system for testing health of avionics software, the system comprising:
- a processor for avionics;
- a memory coupled to the processor; and
- a program residing in the memory and configured to be executed by the processor, the program configured to test the health of the avionics software, the program comprising a testbed comprising:
  - an input model representing an input system for the avionics software, the input model providing inputs from external systems;
  - a hardware model representing one or more avionics hardware components on which the avionics software runs;
  - a resource modeler coupled to the input model and the hardware model, the resource modeler configured to estimate effects on the avionics software of conditions of the avionics hardware components, other software modules other than the avionics software, or both;
  - one or more interdependency models coupled to the input model and the resource modeler, the interdependency models including information relating to one or more relationships between the avionics software and the hardware that are not modeled in the hardware model and that are utilized by the resource modeler to introduce effects due to faults in the one or more avionics hardware components and to study effects of the faults on the avionics software;
  - a fault injector configured to simulate one or more faults in one or more of the hardware, the other software modules, or the inputs;
  - a disturbance model coupled to the fault injector and the resource modeler, the disturbance model including information relating to a relationship between the one or more faults and the avionics software that is utilized by the resource modeler in estimating the effects on the avionics software of the one or more faults;
  - a plurality of sensor models configured to detect conditions of the hardware; and
  - a plurality of monitors configured to detect conditions of the avionics software;
  - wherein the resource modeler is coupled to the plurality of sensors and the plurality of monitors and is configured to estimate the effects on the avionics software using the conditions of the hardware and the conditions of the avionics software.

10. The system of claim 9, wherein the input model comprises a bus module representing a bus used to provide values from the input system to the avionics software.

11. The system of claim 9, wherein the resources modeler comprises a resources unit configured to at least facilitate estimating the effects on the avionics software of an allocation of one or more resources of a computer device.

12. The testbed of claim 1, wherein the testbed simulates a flight control computer of an aircraft.

13. The testbed of claim 12, wherein the one or more faults are simulated in the avionics hardware components by the fault injector.

14. The testbed of claim 12, wherein the one or more faults are simulated in the other software modules by the fault injector.

15. The testbed of claim 12, wherein the resource modeler mimics a lower level operating system and scheduler functions that manage the avionics software when deployed on the hardware.

16. The testbed of claim 12, wherein the inputs are received through a virtual communications backplane.

17. The testbed of claim 12, wherein the resource modeler is configured to estimate effects on the avionics software of conditions of the avionics hardware components.

18. The testbed of claim 12, wherein the resource modeler is configured to estimate effects on the avionics software of conditions of the other software modules.

19. The testbed of claim 12, wherein the inputs comprise at least one of the following: pilot commands, navigation system inputs, guidance, navigation, and control sensor inputs, guidance, navigation and control actuator inputs.

20. The testbed of claim 19, wherein the inputs comprise each of the following:
pilot commands, navigation system inputs, guidance, navigation, and control sensor inputs, guidance, navigation and control actuator inputs.

* * * * *